United States Patent
Delorme et al.

(10) Patent No.: US 8,745,998 B2
(45) Date of Patent: Jun. 10, 2014

(54) METHODS AND SYSTEMS FOR CONTROLLING VEHICLE DEFROST UNITS

(75) Inventors: Gilles M. Delorme, Whitby (CA); Thomas D. Hagen, Grand Blanc, MI (US); Todd M. Tumas, Taylor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 946 days.

(21) Appl. No.: 12/871,664

(22) Filed: Aug. 30, 2010

(65) Prior Publication Data

US 2012/0047929 A1 Mar. 1, 2012

(51) Int. Cl.
*F25D 21/06* (2006.01)

(52) U.S. Cl.
USPC .............................. 62/156; 165/230; 165/233

(58) Field of Classification Search
USPC .............................. 62/80, 151, 154–156, 234; 165/230–233
See application file for complete search history.

(56) References Cited

U.S. PATENT DOCUMENTS

| 6,834,509 B2 * | 12/2004 | Palfy et al. ...................... 62/140 |
| 7,051,946 B2 | 5/2006 | Bash et al. |
| 2010/0004863 A1 * | 1/2010 | Ladow et al. ..................... 702/3 |

FOREIGN PATENT DOCUMENTS

WO 2009082401 A1 7/2009

OTHER PUBLICATIONS

State Intellectual Property Office of The P.R.C., Office Action in Chinese Patent Application No. 201110252291.X, mailed Sep. 24, 2013.

\* cited by examiner

*Primary Examiner* — Marc Norman
(74) *Attorney, Agent, or Firm* — Ingrassia Fisher & Lorenz, P.C.

(57) ABSTRACT

Methods and systems are provided for controlling a defrost unit for a vehicle. A prediction is performed as to whether condensation has formed against a surface of the vehicle. The defrost unit is automatically activated when it is predicted that the condensation has formed against the surface. Another prediction is made as to whether condensation has dissipated from the surface while the defrost unit is operating. The defrost unit is automatically deactivated when it is predicted that the condensation has dissipated.

15 Claims, 3 Drawing Sheets

US 8,745,998 B2

METHODS AND SYSTEMS FOR CONTROLLING VEHICLE DEFROST UNITS

TECHNICAL FIELD

The present invention generally relates to the field of vehicles and, more specifically, to methods and systems for controlling defrost units of vehicles.

BACKGROUND OF THE INVENTION

Many vehicles, such as automobiles, include vehicle defrost units. For example, a vehicle defrost unit can reduce or eliminate frost accumulation on a surface of the vehicle, such as a front windshield or rear backlite of the vehicle. Vehicle defrost units are typically operated manually by a driver or other occupant of the vehicle. However, such manual operation may result in less than optimal operation of the vehicle defrost unit. For example, a driver may not immediately realize when the windshield or backlite has been defrosted, and therefore may not deactivate the defrost unit at an optimal time. This may result in greater than optimal energy consumption, vehicle emissions, and wear on the defrost unit. Similarly, a driver may not manually activate the windshield or backlite in an optimal manner.

Accordingly, it is desirable to provide methods for improved vehicle defrost control, for example that may result in more optimal use of vehicle defrost units. It is also desirable to provide systems for such improved vehicle defrost control. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method for controlling a defrost unit for a vehicle is provided. The method comprises the steps of predicting whether condensation has formed against a surface of the vehicle, and automatically activating the defrost unit when it is predicted that condensation has formed against the surface.

In accordance with another exemplary embodiment, a method for controlling a defrost unit for a vehicle is provided. The method comprises the steps of predicting whether condensation has dissipated from a surface of the vehicle while the defrost unit is operating, and automatically deactivating the defrost unit when it is predicted that the condensation has dissipated.

In accordance with a further exemplary embodiment, a system for controlling a defrost unit for a vehicle is provided. The system comprises a data unit and a processor. The data unit is configured to obtain data regarding a parameter pertaining to the vehicle. The processor is coupled to the data unit. The processor is configured to predict, using the data, whether condensation has formed against a surface of the vehicle, and to automatically activate the defrost unit when it is predicted that the condensation has formed against the surface.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
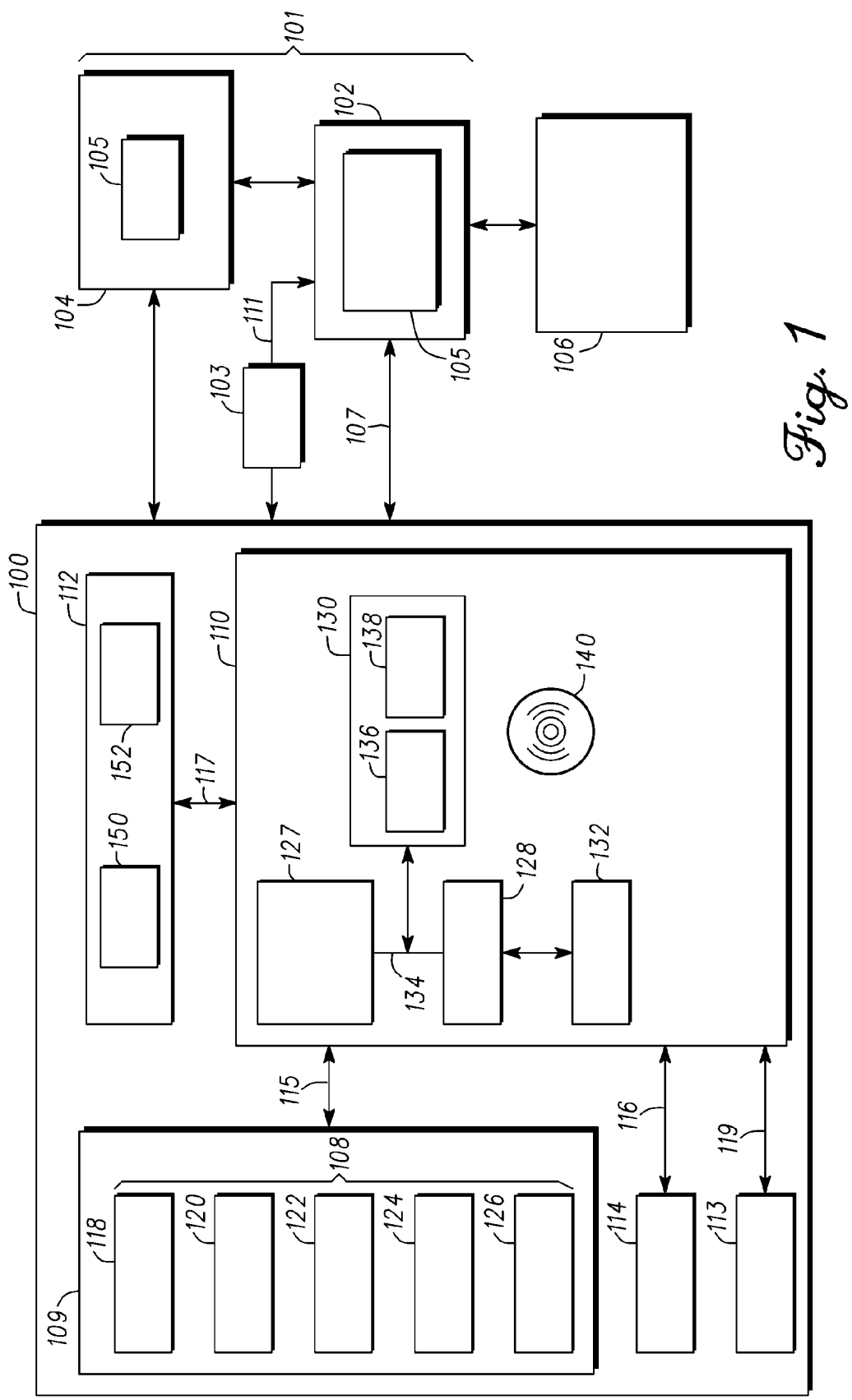
FIG. 1 is a functional block diagram of a system for controlling a defrost unit of a vehicle, in accordance with an exemplary embodiment.

FIG. 1 is a block diagram of an exemplary system 100 for controlling a defrost unit 102 of a vehicle. The defrost unit 102 is used for defrosting one or more surfaces 101 of the vehicle. In one preferred embodiment, the defrost unit 102 is used to defrost a backlite 104 (or rear glass) of the vehicle. In certain examples, the defrost unit 102 may be used to defrost one or more other surfaces 106 of the vehicle, such as, by way of example, a front windshield, one or more windows and/or mirrors, and/or side glass of the vehicle. As used throughout this application, the term "surface" shall refer to any exterior surface of the vehicle, and shall specifically include, without limitation, a rear backlite, a front windshield, a mirror, a window, or side glass of the vehicle.

The defrost unit 102 includes an electric grid 105 that produces heat across the surface 101, and that defrosts the surface 101 accordingly based on instructions provided by the system 100. As used throughout this application the term "defrost" shall represent any heating of a surface of a vehicle, including without limitation, defrost and defog functions for heating a backlite, windshield, mirror, window, side glass, or other surface of the vehicle. The electric grid 105 is coupled to a battery 103 of the vehicle via an electric circuit 111.

The system 100 controls operation of the defrost unit 102. Specifically, the system 100 controls automatic activation and deactivation of the defrost unit 102 based on predictions generated by the system 100 as to condensation on a surface of the vehicle. In a preferred example, the predictions are made as to whether condensation has formed against the surface 101 that the defrost unit 102 is configured to defrost. In certain other examples, the predictions are made as to whether condensation has formed against a different surface.

The system 100 also allows for manual operation of the defrost unit through engagement of a user interface 113 by a driver or other occupant of the vehicle. The system 100 is coupled to the defrost unit 102 via a first communication link 107. In one example, the first communication link 107 comprises a serial data connection.

As depicted in FIG. 1, the system 100 includes at least one data unit 108, a computer system 110, a display 112, and the user interface 113. The data unit 108 preferably includes one or more sensors 109 and, in certain examples, may also include one or more receivers 114. The sensors 109 preferably include a humidity sensor 118, an outside air temperature sensor 120, an electric current sensor 122, and a voltage sensor 124. The values from the various sensors 109 are supplied to the computer system 110 for use in determining whether there is condensation against the surface 101 (e.g., the backlite 104, and/or one or more other surfaces 101 of the vehicle), and for controlling operation of the defrost unit 102 accordingly, in accordance with the steps of the process 200 depicted in FIGS. 2-3 and described further below in connection therewith.

The humidity sensor 118 measures a humidity of outside air proximate the vehicle, and is preferably disposed within an air induction box of the vehicle. The outside air temperature sensor 120 measures an outside air temperature proximate the vehicle, and is preferably disposed proximate, and directly below, a front grill of the vehicle. The electric current sensor 122 measures an electric current of the vehicle, and is preferably disposed on the electric circuit 111 between the battery 103 and the electric grid 105. The voltage sensor 124 measures a voltage drop across the electric grid 105, and is preferably also disposed on the electric circuit 111 between the battery 103 and the electric grid 105. Alternatively, the voltage sensor 124 may measure a vehicle battery voltage in certain embodiments. In certain examples, the sensors 109 may also include one or more additional sensors 126, such as, by way of example, a dew point sensor and/or a defrost unit temperature sensor disposed on or within the vehicle.

The receivers 114, if any, receive signals or messages with data pertaining to one or more parameter values for use by the computer system 110 in determining whether there is condensation against the surface 101 (e.g., the backlite 104, and/or one or more other surfaces 101 of the vehicle), in accordance with the steps of the process 200 depicted in FIGS. 2-3 and described further below in connection therewith. For example, a receiver 114 may receive humidity, outside air temperature, electric current, voltage, dew point, and/or defrost unit temperature values from one or more of the above-referenced sensors 109, and/or from one or more other sources (for example, a weather service, a vehicle computer, a vehicle communication bus, a vehicle climate control system, other vehicle systems, a central database, a vehicle manufacturer or service center, cellular networks, satellite signals, or the like). In certain examples, such values, instead of or in addition to those supplied by the various sensors 109, may be supplied by the receivers 114 to the computer system 110 for use in determining whether there is condensation on the surface 101 (e.g., the backlite 104, and/or one or more other surfaces 101 of the vehicle), and for controlling operation of the defrost unit 102 accordingly, in accordance with the steps of the process 200 depicted in FIGS. 2-3 and described further below in connection therewith.

The user interface 113 receives inputs from a user or other occupant of the vehicle when the user or other occupant wishes to manually activate or deactivate the defrost unit 102. Such inputs are provided to the computer system 110 for activation or deactivation of the defrost unit 102 in accordance with the preferences of the driver or other occupant of the vehicle. In one example, the user interface 113 comprises a button and/or switch for engagement by the user or other occupant of the vehicle.

The computer system 110 is coupled to the defrost unit 102, the data unit 108, the display 112, and the user interface 113. Specifically, the computer system 110 is preferably coupled to the defrost unit 102 via the first communication link 107, to the sensors 109 via a second communication link 115, to the receivers (if any) via a third communication link 116, and to the display 112 via a fourth communication link 117. Similar to the first communication link 107 (described above), the second, third, and fourth communication links 115, 116, and 117, in one example, comprise serial data connections.

The computer system 110 preferably controls the operation of the defrost unit 102, along with the data units 108 and the display 112. Specifically, the computer system 110 receives data from the sensors 109 and/or the receivers 114 (for example, as described above), processes the data to determine whether there is condensation against the surface 101 (e.g., the backlite 104, and/or one or more other surfaces 101 of the vehicle), and controls automatic activation and deactivation of the defrost unit 102 accordingly, in accordance with the steps set forth in the process 200 depicted in FIGS. 2-3 and described further below in connection therewith.

In addition, as mentioned above, the computer system 110 also receives the inputs from the user interface 113 and allows the driver or other vehicle occupant to manually control activation or deactivation of the defrost unit 102 when the driver or other vehicle occupant wishes to do so, also in accordance with the steps set forth in the process 200 depicted in FIGS. 2-3 and described further below in connection therewith. The computer system 110 also controls operation of the display 112, described further below. In certain examples, the computer system 110 may also be coupled directly or indirectly to the surface 101 (e.g., the backlite 104, and/or one or more other surfaces 101 of the vehicle), and may facilitate control thereof (for example, of heating thereof).

In the depicted embodiment, the computer system 110 includes a processor 127, a memory 130, an interface 128, a storage device 132, and a bus 134. The processor 127 performs the computation and control functions of the computer system 110, in accordance with the steps set forth in the process 200 depicted in FIGS. 2-3 and described further below in connection therewith. The processor 127 may comprise one processor or multiple processors, single integrated circuits such as a microprocessor, or any suitable number of integrated circuit devices and/or circuit boards working in cooperation to accomplish the functions of a processing unit. During operation, the processor 127 executes one or more programs 136 contained within the memory 130 and, as such, controls the general operation of the computer system 110.

The memory 130 can be any type of suitable memory. This would include the various types of dynamic random access memory (DRAM) such as SDRAM, the various types of static RAM (SRAM), and the various types of non-volatile memory (PROM, EPROM, and flash). The memory 130 stores the above-referenced programs 136 in addition to look-up tables 138 for use by the processor 127. The look-up tables 138 preferably include look-up tables quantifying a relationship between a resistance of the electric grid 105 and a temperature of a surface of the surface 101, in addition to one or more predetermined thresholds for use in automatically controlling the operation of the defrost unit 102. The memory 130 is preferably co-located with the processor 127 on the same chip. The bus 134 serves to transmit programs, data, status and other information or signals between the various components of the computer system 110.

The interface 128 allows communication to the computer system 110, for example from a system driver and/or another computer system, and can be implemented using any suitable method and apparatus. It can include one or more network interfaces to communicate with other systems or components. The interface 128 may also include one or more network interfaces to communicate with technicians, and/or one or more storage interfaces to connect to storage apparatuses, such as the storage device 132.

The storage device 132 can be any suitable type of storage apparatus, including direct access storage devices such as hard disk drives, flash systems, floppy disk drives and optical disk drives. In one exemplary embodiment, the storage device 132 comprises a program product from which memory 130 can receive a program 136 that executes one or more embodiments of one or more processes, such as the process 200 of FIGS. 2-3 (or portions thereof). In another exemplary embodiment, the program product may be directly stored in and/or otherwise accessed by the memory 130 and/or a disk (for example, disk 140) such as that referenced below.

The bus 134 can be any suitable physical or logical means of connecting computer systems and components. This includes, but is not limited to, direct hard-wired connections, fiber optics, infrared and wireless bus technologies. During operation, the program 136 is stored in the memory 130 and executed by the processor 127.

It will be appreciated that while this exemplary embodiment is described in the context of a fully functioning computer system, those skilled in the art will recognize that the mechanisms are capable of being distributed as a program product in a variety of forms. Examples of signal bearing media include: recordable media such as floppy disks, hard drives, memory cards and optical disks, and transmission media such as digital and analog communication links. It will similarly be appreciated that the computer system 110 may also otherwise differ from the embodiment depicted in FIG. 1, for example in that the computer system 110 may be coupled to or may otherwise utilize one or more remote computer systems and/or other control systems.

The display 112 provides one or more indications pertaining to the operation or status of the defrost unit 102. In the depicted example, the display 112 includes a visual component 150 and an audio component 152. In certain examples, the display 112 may include only one component, such as a visual component 150.

The visual component 150 provides a first visual indication when the defrost unit 102 has been activated and a second visual indication when the defrost unit 102 has been deactivated. In certain examples, the visual indications may vary based on whether the activation or deactivation was performed automatically based on the computer system 110 calculations rather than manually via user input. In one example, the visual component 150 comprises a light on a vehicle dashboard, for example that turns on when the defrost unit 102 is activated and turns off when the defrost unit 102 is deactivated. The visual component 150 may comprise an icon or indicator displayed on a display, for example on or proximate a dashboard of the vehicle.

The audio component 152, if any, provides a first audible indication when the defrost unit 102 has been activated and a second audible indication when the defrost unit 102 has been deactivated. In certain examples, the audible indications may vary based on whether the activation or deactivation was performed automatically based on the computer system 110 calculations rather than manually via user input. In one example, the audio component 152 comprises a speaker that produces a simulated voice stating that the defrost unit 102 has been activated or deactivated and/or how (for example automatically or manually) the defrost unit 102 has been activated or deactivated.

Figure 2:
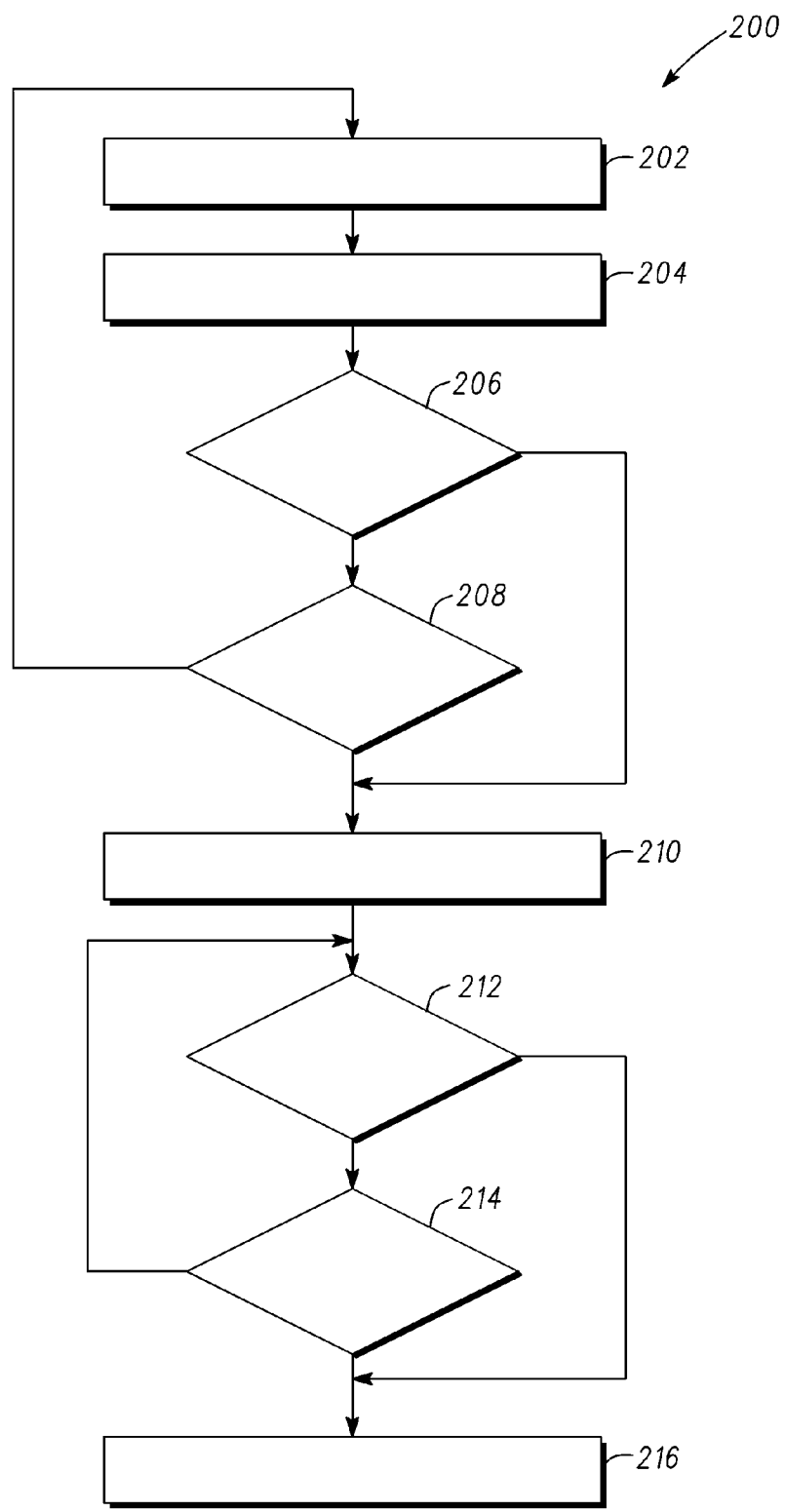
FIG. 2 is a flowchart of a process for controlling a defrost unit of a vehicle, and that can be implemented in connection with the system of FIG. 1, in accordance with an exemplary embodiment.

FIG. 2 is a flowchart of a process 200 for controlling a defrost unit of a vehicle, in accordance with an exemplary embodiment. The process 200 can preferably be implemented in connection with the system 100 and the defrost unit 102 of FIG. 1, in which the defrost unit 102 of FIG. 1 is configured to defrost one or more surfaces 101 of FIG. 1. The process 200 is depicted in FIG. 2 and described below under exemplary conditions in which (a) an engine of the vehicle is already running or has received a remote start request; and (b) the defrost unit is initially in an off, or deactivated position, in which heating or defrosting does not occur.

As depicted in FIG. 2, the process 200 begins with the step of receiving user input (step 202). The user input is received when a driver or other occupant of the vehicle indicates a preference for manual activation or deactivation of the defrost unit of the vehicle. The user input is preferably received in this manner continuously throughout the process 200 whenever such a preference is indicated by a driver or other occupant of the vehicle. The user input is preferably received by the user interface 113 of FIG. 1 and provided to the processor 127 of the computer system 110 of FIG. 1 for processing.

In addition, data is obtained regarding parameters pertaining to the vehicle (step 204). In one preferred embodiment, the data comprises various values obtained via the data unit 108 of FIG. 1, including a humidity measure of outside air proximate the vehicle measured by the humidity sensor 118 of FIG. 1, an outside air temperature measured by the outside air temperature sensor 120 of FIG. 1, an electric current of the vehicle measured by the electric current sensor 122 of FIG. 1, and a voltage drop across the electric grid 105 of FIG. 1 (or, alternatively, a vehicle battery voltage) measured by the voltage sensor 124 of FIG. 1. In certain examples, a dew point value may be measured by a dew point sensor, and/or one or more temperature values proximate the defrost unit may be measured by a defrost unit temperature sensor, and so on.

The various values of step 204 are provided to the processor 127 of FIG. 1 for processing. In certain examples, one or more such values (for example, humidity, outside air temperature, electric current, voltage, dew point, and/or defrost unit temperature values) may be obtained via one or more receivers 114 of FIG. 1 (for example, from one or more of the above-referenced sensors 109, and/or from one or more other sources, such as a weather service, a vehicle computer, a vehicle communication bus, a vehicle climate control system, other vehicle systems, a central database, a vehicle manufacturer or service center, cellular networks, satellite signals, or the like) and provided to the processor 127 of FIG. 1 for processing. The various values of step 204 are preferably obtained continuously throughout the process 200.

A determination is made as to whether the user input indicates that a driver or other vehicle occupant desires to have the defrost unit manually activated (step 206). This step is preferably performed continuously during the process 200 provided that the defrost unit is currently in a deactivated state. This determination is preferably made by the processor 127 of FIG. 1 utilizing the user input obtained from the user interface 113 of FIG. 1 during step 202.

If it is determined from the user input that the driver or other vehicle occupant has indicated a desire for activation of the defrost unit, then the process skips to step 210. As described further below, during step 210, the defrost unit is activated. As used throughout this application, activation of the defrost unit means that the defrost unit is turned on, so that the electric grid (for example, the electric grid 105 of FIG. 1) of the defrost unit provides heat to the surface (for example, to the backlite 104 of FIG. 1).

Conversely, if no indication is determined from the user input that the driver or other vehicle occupant has indicated a desire for activation of the defrost unit, then a prediction is made as to whether condensation has formed on a surface of the vehicle, such as a surface 101 of FIG. 1 (e.g., the backlite 104 of FIG. 1) (step 208). This preferably comprises a prediction as to whether condensation has formed against a surface of the vehicle (preferably, proximate the surface 101 of FIG. 1 to which the defrost unit 102 of FIG. 1 is configured to apply heat). This determination is preferably made by the processor 127 of FIG. 1 continuously during the process 200, using the data obtained during step 204. FIG. 3 depicts a preferred embodiment for the prediction of step 208, which will be described below with reference to FIG. 3.

Figure 3:
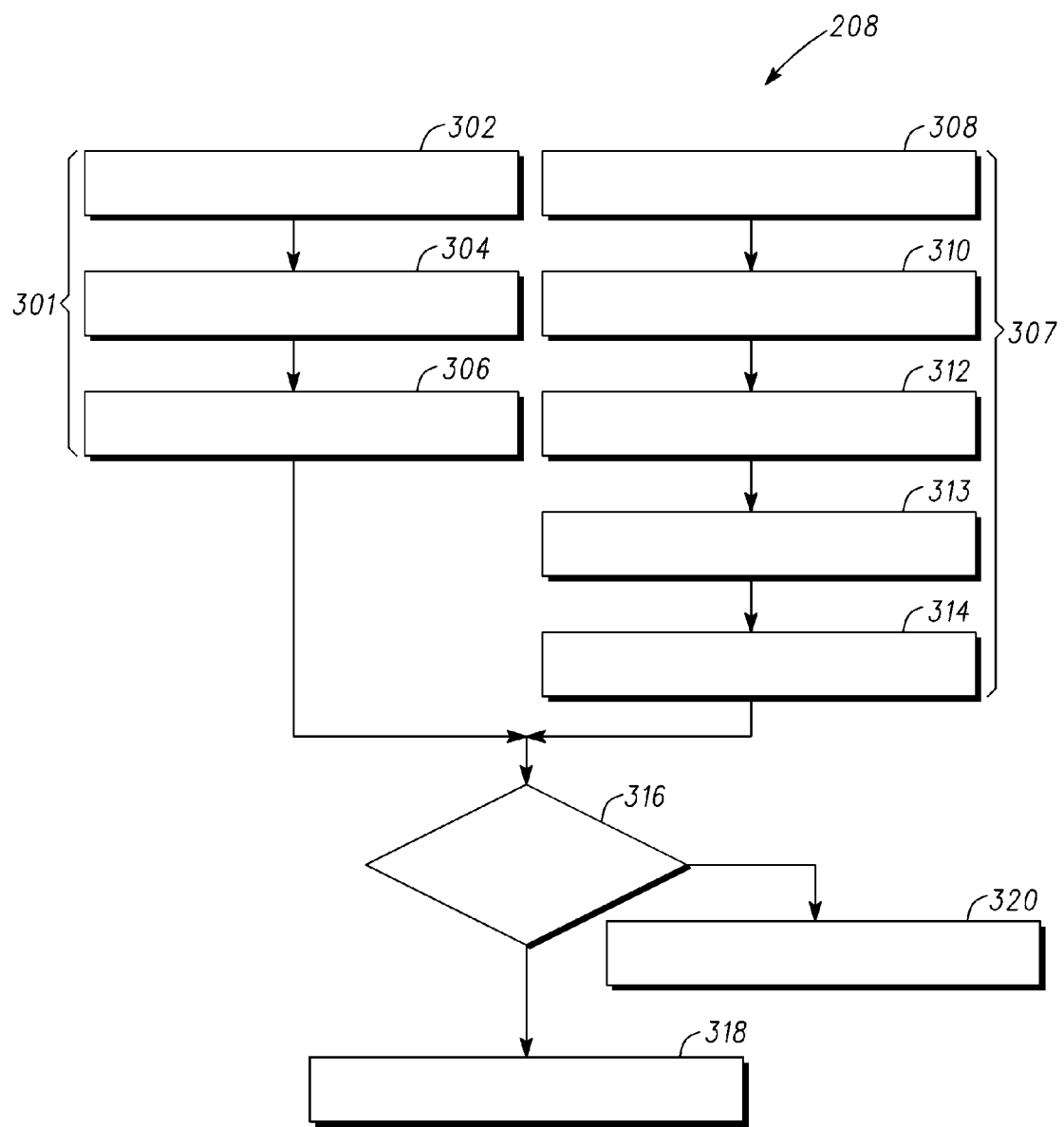
FIG. 3 is a flowchart of a step or sub-process of the process of FIG. 1, specifically, a step or sub-process of determining whether condensation has formed on a surface of the vehicle, in accordance with an exemplary embodiment.

As depicted in FIG. 3, the step or sub-process 208 of predicting whether condensation has formed against the surface includes a combined step of determining a dew point of outside air proximate the vehicle (step 301). Step 301 includes obtaining a humidity value of outside air proximate the vehicle (step 302). The humidity value is preferably measured by the humidity sensor 118 of FIG. 1 and provided to the processor 127 of FIG. 1 for processing. However, in certain examples, the humidity value may be obtained by a receiver 114 of FIG. 1 and provided to the processor 127 for processing.

In addition, an outside air temperature value is obtained (step 304). The outside air temperature value is preferably measured by the outside air temperature sensor 120 of FIG. 1 and provided to the processor 127 of FIG. 1 for processing. However, in certain examples, the outside air temperature value may be obtained by a receiver 114 of FIG. 1 and provided to the processor 127 for processing.

A dew point value is determined (step 306). The dew point value preferably corresponds to a dew point of outside air proximate the vehicle. The dew point value is preferably calculated by the processor 127 of FIG. 1 using the humidity value of step 302 and the outside air temperature value of step 304 in accordance with the following equation:

$$DP = -1762.39/(LOG_{10}(((RH)*100)*10^\wedge(8.1332-1762.39/(OAT+235.66))/100)-8.1332)-235.66,$$

in which DP represents the dew point, RH represents the relative humidity, and OAT represents the outside air temperature. In certain other embodiments, the dew point value may be obtained by the processor 127 of FIG. 1 via a receiver 114 of FIG. 1, for example from a weather service or from some other source. The dew point value is used in predicting whether condensation has formed against the surface, as described further below in connection with step 316.

In addition, during another combined step, a surface temperature is determined (step 307). The surface temperature comprises a temperature proximate a surface of the vehicle (preferably, proximate the surface 101 of FIG. 1 to which the defrost unit 102 of FIG. 1) is configured to apply heat. In one embodiment, step 307 comprises a determination of a temperature of the grid element of the defrost unit. In another exemplary embodiment, step 307 comprises a determination of a temperature of the surface (for example, the backlite 104 of FIG. 1) itself. The surface temperature preferably comprises a temperature at a point located on the outside portion of the surface (e.g., on the outer surface of the backlite 104 of FIG. 1) in-between the grid element. Because this virtual point on the glass can not be measured physically, an estimate is determined.

As depicted in FIG. 3, the combined step 307 includes obtaining an electric current value of the vehicle (step 308). The electric current value is preferably measured by the electric current sensor 122 of FIG. 1 and provided to the processor 127 of FIG. 1 for processing. However, in certain examples, the electric current value may be obtained by a receiver 114 of FIG. 1 and provided to the processor 127 for processing.

In addition, a voltage measure is obtained (step 310). In one embodiment, the voltage measure comprises a voltage drop across the electric grid (for example, the electric grid 105 of FIG. 1). Alternatively, in certain embodiments, the voltage measure comprises a vehicle battery voltage. The value of the voltage measure is preferably measured by the voltage sensor 124 of FIG. 1 and provided to the processor 127 of FIG. 1 for processing. However, in certain examples, the value of the voltage measure may be obtained by a receiver 114 of FIG. 1 and provided to the processor 127 for processing.

An electrical resistance across the electric grid is determined (step 312). The electrical resistance is preferably calculated by the processor 127 of FIG. 1 using the electric current value of step 308 and the value of the voltage measure of step 310 using Ohm's Law, in accordance with the following equation:

$$R = V/I,$$

in which R represents resistance, V represents voltage, and I represents current. In certain other embodiments, a value of the electrical resistance may be obtained via one or more other sensors and/or via a receiver 114 of FIG. 1, for example from another vehicle computer or system, and provided to the processor 127 for processing.

An electric grid temperature is determined (step 313). The electric grid temperature comprises a temperature proximate an electric grid of the defrost unit of a surface of the vehicle (preferably, proximate the surface 101 of FIG. 1) to which the defrost unit 102 of FIG. 1 is configured to apply heat. The electric grid temperature is preferably calculated by the processor 127 of FIG. 1 using the resistance of step 312 and a look-up table that quantifies a relationship between the electric grid resistance and the electric grid temperature based upon experimental data. The look-up table preferably corresponds to the look-up table 138 of FIG. 1, and is stored in the memory 130 of FIG. 1 and retrieved therefrom by the processor 127 for processing during step 314. In certain examples, the electric grid temperature may be measured directly by a temperature sensor disposed proximate the surface (e.g., the backlite 104 of FIG. 1) and/or an electric grid element of the surface, and/or may be obtained via a receiver 114 of FIG. 1 by a vehicle communication bus, a vehicle climate control system, one or more other vehicle systems, and/or other sources.

The surface temperature is then determined (step 314). Specifically, the grid element temperature is combined with an average non-heated surface temperature estimate to determine the inside surface temperature. In one embodiment, the grid element temperature is combined proportionally with the non-heated surface temperature estimate. In other embodiments, finite elements analysis or other numerical methods techniques may be utilized. In either case, the grid element temperature and the average non-heated surface temperature (preferably stored in the memory 130 of FIG. 1) are inputted into the following equation for the conservation of energy:

$$Q_{grid} + Q_{sun} + Q_{cabin} + Q_{glass} + Q_{snow} + Q_{conv} = 0,$$

in which $Q_{grid}$ represents the heat energy generated by the grid elements $Q_{sun}$ represents the heat energy input by the sun, $Q_{cabin}$ represents the heat energy input by the inside cabin air, $Q_{conv}$ represents the heat energy loss from the outside airflow convection, $Q_{glass}$ represents the heat energy conduction across the rear glass, and $Q_{snow}$ represents the heat energy absorbed by a thermal mass (e.g., frost, snow, or ice) on the surface (e.g., the backlite 104 of FIG. 1). $Q_{grid}$ is preferably computed using the voltage and the current values in accordance with the following equation:

$$Q_{grid} = \text{Voltage} \times \text{Current}.$$

In order to solve the equation, a desired outside surface temperature is fixed (e.g., on a point on the outside surface of the backlite 104 in-between the grid elements) and use the electric grid temperature and an average non-heated glass temperature (preferably stored in the memory 130 of FIG. 1) for the (inside) surface temperature. In one exemplary embodiment: $Q_{cabin}$ is computed within the vehicle using existing climate control algorithms. $Q_{convection}$ is preferably calculated using the following equation:

$$Q=hA(dT),$$

in which h represents the convection heat transfer coefficient, A represents the surface area, and dT represents Delta-T, or a temperature difference between the outside air passing over the surface. The convection heat transfer coefficient (h), is preferably obtained using a look-up table of the heat transfer coefficient versus vehicle speed (preferably stored in the memory 130 of FIG. 1). Qglass is preferably computed using the following equation:

$$Q=kA(dt)/x,$$

in which k represents the thermal conductivity of the surface material (preferably, glass), A represents the surface area of the surface, dt represents the temperature difference between the inside of the surface (e.g., an inner surface of the glass) and the fixed threshold (e.g., ten degrees Celsius) on the outside of the surface (e.g., an outer surface of the glass), and x is the thickness of the surface (e.g., the thickness of the glass). $Q_{sun}$ is preferably obtained using a solar sensor. $Q_{snow}$ preferably represents any thermal mass on the outside surface, and is calculated using the equation:

$$Q=kA(dt)/x,$$

in which k represents the thermal conductivity of ice/snow/frost, A is the surface area of the surface (e.g., of the glass), dt is the temperature difference between the fixed threshold (e.g., ten degrees Celsius) on the outside surface and the temperature of the thermal mass, and x is the thickness of the thermal mass. The surface temperature is used, along with the dew point value of step 306, in predicting whether condensation has formed against the surface, as described directly below in connection with step 316.

A prediction is made as to whether condensation has formed against the surface (step 316). This prediction preferably comprises a prediction as to whether condensation has formed against the surface of the vehicle (preferably, proximate the surface 101 of FIG. 1) to which the defrost unit 102 of FIG. 1 is configured to apply heat. The prediction of step 316 is preferably made using the dew point value of step 306 and the surface temperature of step 314. Specifically, during step 316, a determination is made as to whether the surface temperature of step 314 is less than the dew point.

If the surface temperature of step 314 is determined to be less than the dew point value of step 306, then it is determined or predicted that condensation is likely to have formed against the surface and to be present on the surface (step 318). Conversely, if the surface temperature of step 314 is determined to be greater than or equal to the dew point value of step 306, then it is determined or predicted that condensation is not likely to have formed against the surface or to be present on the surface (step 320). The predictions/determinations of steps 316-320 are preferably made by the processor 127 of FIG. 1. Steps 302-320 are preferably performed continuously during the process 200.

As described above, FIG. 3 depicts a preferred embodiment for predicting whether condensation has formed against the vehicle surface. However, in certain embodiment, various alternative methods for determining condensation on the surface for step 208. For example, in certain embodiments, acoustic sensing, vision systems, infra-red sensing, and/or other means may be used, instead of or in addition to the techniques described above in connection with steps 302-320 in predicting whether condensation has formed against the surface of the vehicle.

Returning to FIG. 2, if it is determined in step 208 (for example, in steps 316 and 318 of FIG. 3) that condensation has formed against the surface, then the process proceeds to the above-referenced step 210. During step 210, the defrost unit is activated. The activation of the defrost unit is preferably initiated via instructions provided by the processor 127 of FIG. 1 to the defrost unit 102 of FIG. 1 along the first communication link 107.

Conversely, if it is determined in step 208 (for example, in steps 316 and 320 of FIG. 3) that condensation has not formed against the surface, then the process proceeds instead back to the above-referenced step 202. Steps 202-208 continue to repeat, and the defrost unit remains in a deactivated state, until a determination is made in a subsequent iteration of step 206 or step 208 to activate the defrost unit.

Returning to step 210, as the defrost unit is activated, and as the defrost unit remains in an activated state, the user input of step 202 continues to be obtained, the data of step 204 continues to be obtained, and the determinations of step 208 (including those described above in connection with FIG. 3, in a preferred embodiment) continue to be performed, preferably continuously. In addition, as the defrost unit continues to operate in its activated state, a determination is made as to whether a driver or other vehicle occupant has expressed a desire to deactivate the defrost unit (step 212). The determination of step 212 is preferably made by the processor 127 of FIG. 1 using the user input of step 202.

If it is determined that a driver or other vehicle occupant has expressed a desire to deactivate the defrost unit, then the defrost unit is deactivated (step 216). As used throughout this application, deactivation of the defrost unit means that the defrost unit is turned off, so that the electric grid (for example, the electric grid 105 of FIG. 1) of the defrost unit no longer provides heat to the surface (for example, the backlite 104 of FIG. 1). The deactivation of the defrost unit is preferably initiated via instructions provided by the processor 127 of FIG. 1 to the defrost unit 102 of FIG. 1 along the first communication link 107.

Conversely, if it is determined in step 212 that there is no user input indicating that a driver or other vehicle occupant has expressed a desire to deactivate the defrost unit, then a prediction is made as to whether the condensation on the surface has dissipated (step 214). In one preferred embodiment, the prediction of step 214 comprises a comparison between a current (or most recent) value of the surface temperature of step 314 of FIG. 3 and a predetermined threshold. In one preferred embodiment, the predetermined threshold is approximately equal to five degrees Celsius. In another preferred embodiment, the predetermined threshold is approximately equal to ten degrees Celsius. The comparison of step 214 is preferably made by the processor 127. Preferably, the value of the surface temperature is calculated by the processor 127 of FIG. 1 during a current or most recent iteration of step 307 of FIG. 3 during operation of the defrost unit in its activated state. Alternatively, similar to the discussion above, the surface temperature may be obtained directly from one or more sensors, receivers, or the like.

In one example, condensation will be determined to be dissipated form the surface if the heat energy balance equation, described above, is greater than zero. Specifically, when the heat energy balance equation is greater than zero, this indicates that enough heat energy has been provided to clear the surface of condensation accumulation.

If the condensation on the surface is determined to be dissipated (e.g., if the surface temperature is determined to be greater than the predetermined threshold in step 214 and/or the heat energy balance equation is greater than zero), then the process proceeds to the above-referenced step 216, and the defrost unit is deactivated. Conversely, if it is determined in step 214 that the condensation on the surface is determined to not be dissipated (e.g., if the surface temperature is determined to be less than or equal to the predetermined threshold in step 214 and/or the heat energy balance equation is equal to zero), then the process returns to step 212, and steps 212-214 repeat (using new, updated data from steps 202-208) until either (a) a determination is made in a subsequent iteration of step 212 that a driver or other user of the vehicle desires to have the defrost unit deactivated, or (b) a determination is made in a subsequent iteration of step 214 that the condensation has dissipated from the surface.

Accordingly, improved methods and systems are provided for controlling a defrost unit of a vehicle. The disclosed methods and systems provide for automatic activation of the defrost unit if it is predicted that condensation has formed on a surface of the vehicle. Specifically, in one preferred embodiment, a dew point for the outside air proximate the vehicle is determined, along with a surface temperature. If the surface temperature is less than the dew point, then condensation is predicted to have formed against the surface, and the defrost unit is automatically activated accordingly. The surface temperature continues to be determined as the defrost unit operates in its activated state. Once the surface temperature exceeds a predetermined threshold during operation of the defrost unit, the condensation is predicted to be dissipated, and the defrost unit is automatically deactivated accordingly. The automatic activation and deactivation of the defrost unit can effectively reduce energy consumption, vehicle emissions, and wear on the defrost system. The disclosed methods and systems allow a driver or other occupant of the vehicle to override the automatic activation or deactivation of the defrost unit if desired.

It will be appreciated that the disclosed methods and systems may vary from those depicted in the Figures and described herein. For example, various components of the system 100 and/or the defrost unit 102, and/or components thereof, may vary from those depicted in FIG. 1 and/or described above. Similarly, various steps of the process 200 of FIGS. 2-3 may differ from and/or be performed simultaneously and/or in a different order than depicted in FIGS. 2-3 and/or described above. It will similarly be appreciated that the disclosed method and systems may be implemented and/or utilized in connection with any number of different types of automobiles, sedans, sport utility vehicles, trucks, and/or any of a number of other different types of vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for controlling a defrost unit for a vehicle, the defrost unit comprising an electric grid, the method comprising the steps of:
   determining a dew point proximate the vehicle;
   determining a resistance of the electric grid;
   determining a surface temperature proximate a surface of the vehicle using the resistance of the electric grid; and
   automatically activating the electric grid when the surface temperature is less than the dew point.

2. The method of claim 1, further comprising the steps of:
   predicting whether condensation against the surface has dissipated; and
   automatically deactivating the defrost unit when it is predicted that the condensation has dissipated.

3. The method of claim 1, wherein the step of determining the dew point comprises the steps of:
   determining a humidity proximate the vehicle;
   determining an outside air temperature proximate the vehicle; and
   calculating the dew point using the humidity and the outside air temperature.

4. The method of 1, wherein the step of determining the resistance comprises the steps of:
   measuring a voltage of the vehicle;
   measuring a current to the electric grid; and
   determining the resistance using the voltage and the current.

5. The method of claim 1, wherein:
   the step of determining the dew point comprises the steps of:
      determining a humidity proximate the vehicle;
      determining an outside air temperature proximate the vehicle; and
      calculating the dew point using the humidity and the outside air temperature; and
   the step of determining the resistance of the electric grid comprises the steps of:
      measuring a voltage of the vehicle;
      measuring a current to the electric grid; and
      determining the resistance of the electric grid using the voltage and the current.

6. The method of claim 1, further comprising the step of:
   automatically deactivating the defrost unit when the surface temperature exceeds a predetermined value.

7. A method for controlling a defrost unit for a vehicle, the defrost unit comprising an electric grid, the method comprising the steps of:
   determining a resistance of the electric grid;
   determining a surface temperature proximate a surface of the vehicle while the electric grid is operating using the resistance of the electric grid; and
   automatically deactivating the electric grid when the surface temperature exceeds a predetermined threshold.

8. The method of claim 7, wherein the step of determining the resistance comprises the steps of:
   measuring a voltage of the vehicle;
   measuring a current to the electric grid; and
   determining the resistance using the voltage and the current.

9. A system for controlling a defrost unit for a vehicle, the defrost unit comprising an electric grid, the system comprising:
   a data unit configured to obtain data regarding parameters pertaining to the vehicle, the parameters including a dew point proximate the vehicle and a resistance of the electric grid; and
   a processor coupled to the data unit and configured to:
      determine, using the data, a surface temperature proximate a surface of the vehicle using the resistance of the electric grid; and
      automatically activate the electric grid when the surface temperature is less than the dew point.

10. The system of claim 9, wherein the processor is further configured to:
- predict, using the data, whether condensation against the surface has dissipated; and
- automatically deactivate the defrost unit when it is predicted that the condensation has dissipated.

11. The system of claim 9, wherein:
the data unit comprises:
- a first sensor configured to measure a humidity proximate the vehicle; and
- a second sensor configured to measure an outside air temperature proximate the vehicle; and the processor is coupled to the first sensor and the second sensor, and is configured to calculate the dew point using the humidity and the outside air temperature.

12. The system of claim 9, wherein:
the data unit comprises:
- a first sensor configured to measure a voltage of the vehicle; and
- a second sensor configured to measure a current to the electric grid; and the processor is coupled to the first sensor and the second sensor, and is further configured to:
- determine the resistance of the electric grid using the voltage and the current.

13. The system of claim 9, wherein:
the data unit comprises:
- a first sensor configured to measure a humidity proximate the vehicle; and
- a second sensor configured to measure an outside air temperature proximate the vehicle;
- a third sensor configured to measure a voltage of the vehicle; and
- a fourth sensor configured to measure a current to the electric grid; and the processor is coupled to the first sensor, the second sensor, the third sensor, and the fourth sensor, and is further configured to:
- calculate the dew point using the humidity and the outside air temperature; and
- determine the resistance of the electric grid using the voltage and the current.

14. The system of claim 9, wherein the data unit comprises a receiver that is coupled to the processor and configured to receive a value of the dew point, the surface temperature, or both.

15. The system of claim 9, wherein the processor is further configured to deactivate the defrost unit when the surface temperature exceeds a predetermined threshold.

* * * * *